C. H. WRIGHT.
APPARATUS FOR HANDLING ORE.
APPLICATION FILED MAY 27, 1911.
1,007,762.
Patented Nov. 7, 1911.
8 SHEETS—SHEET 4.
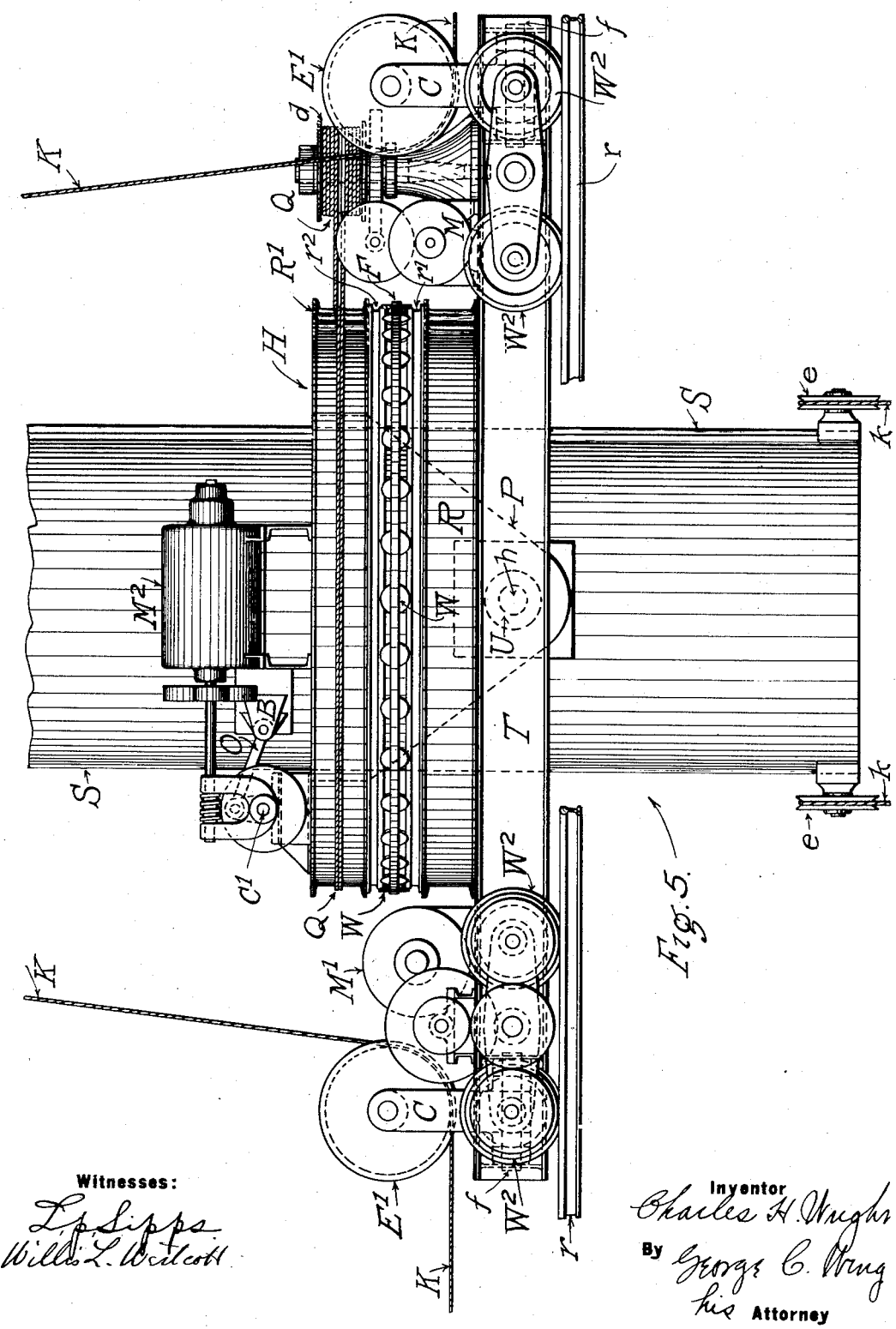

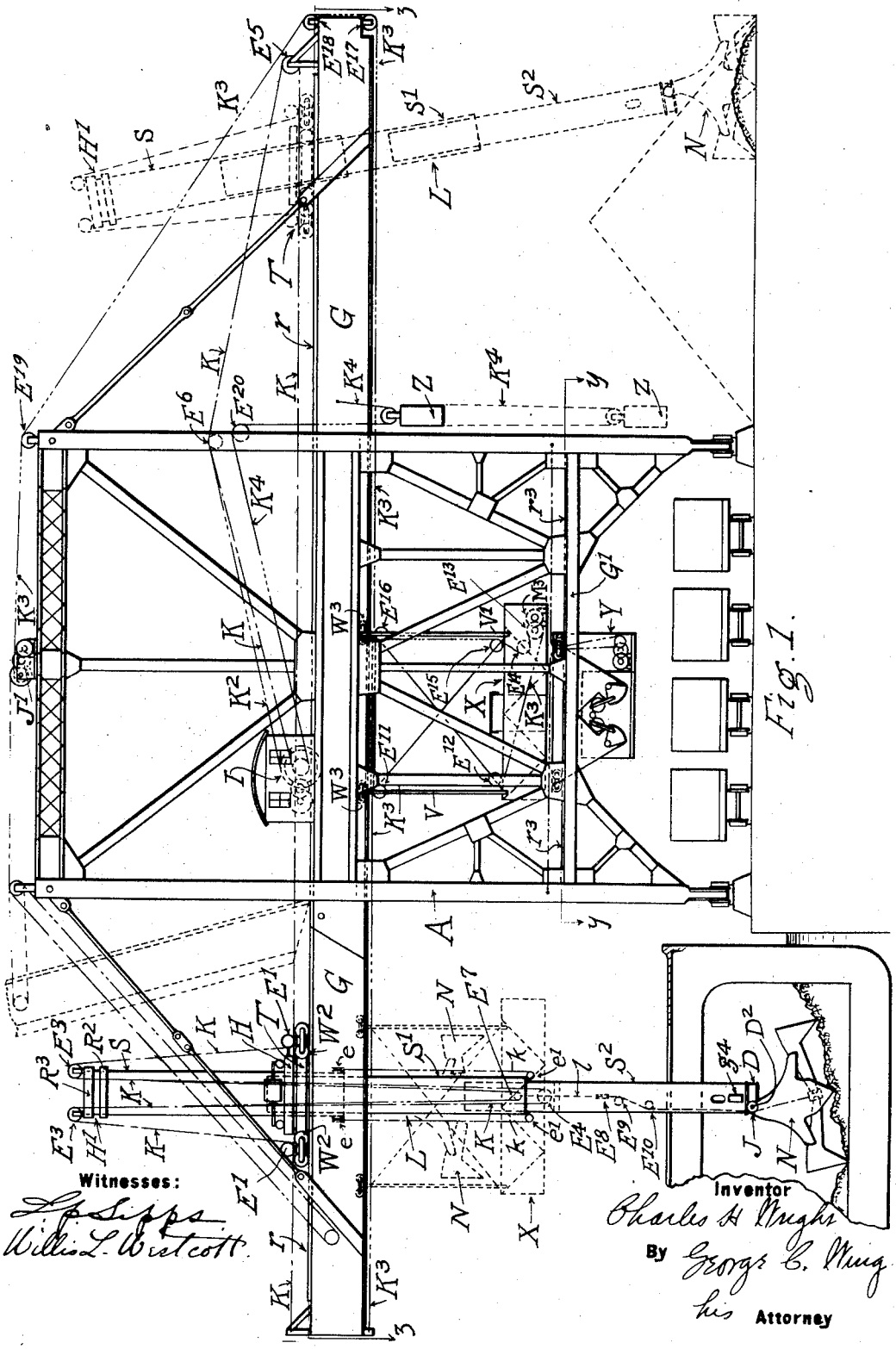

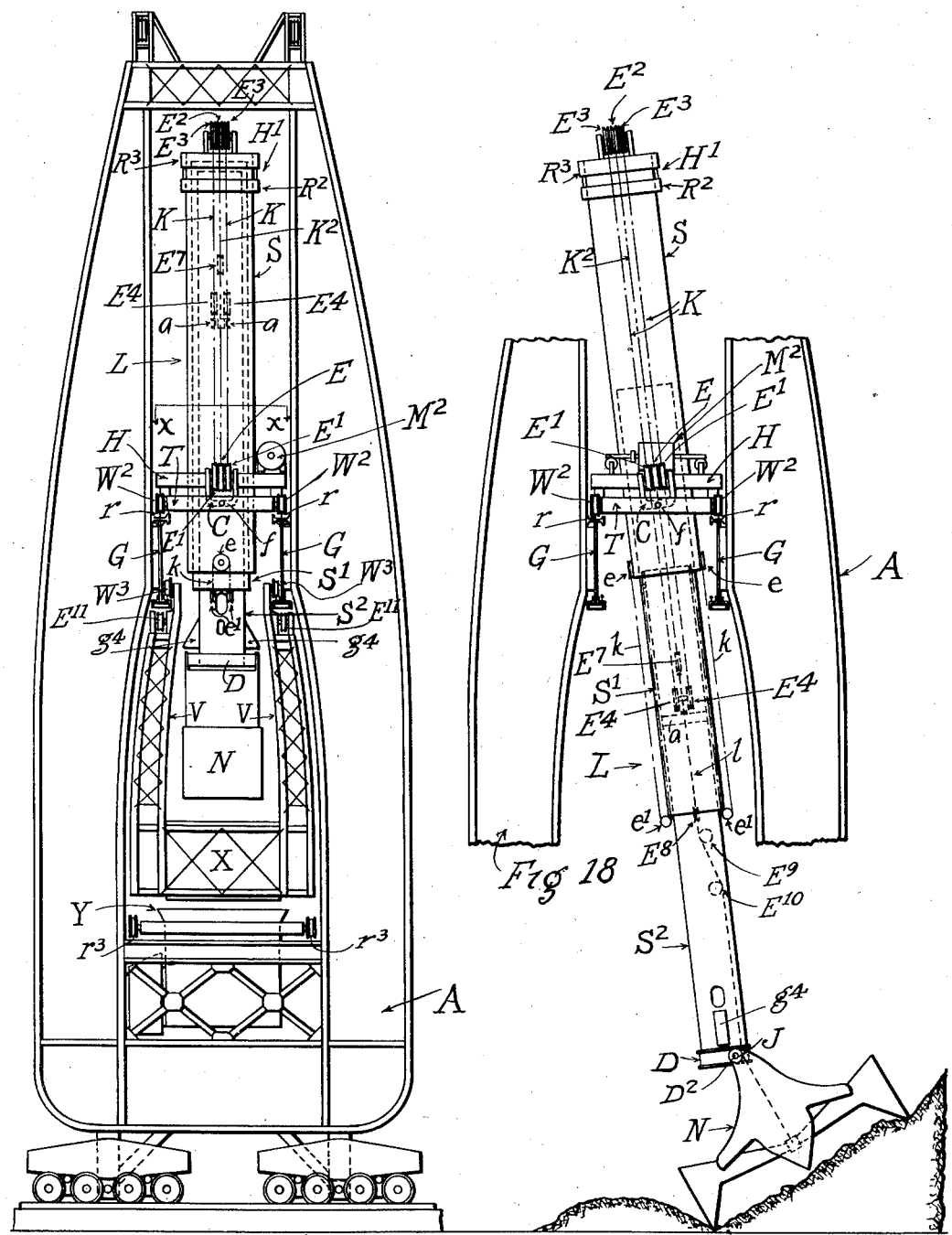

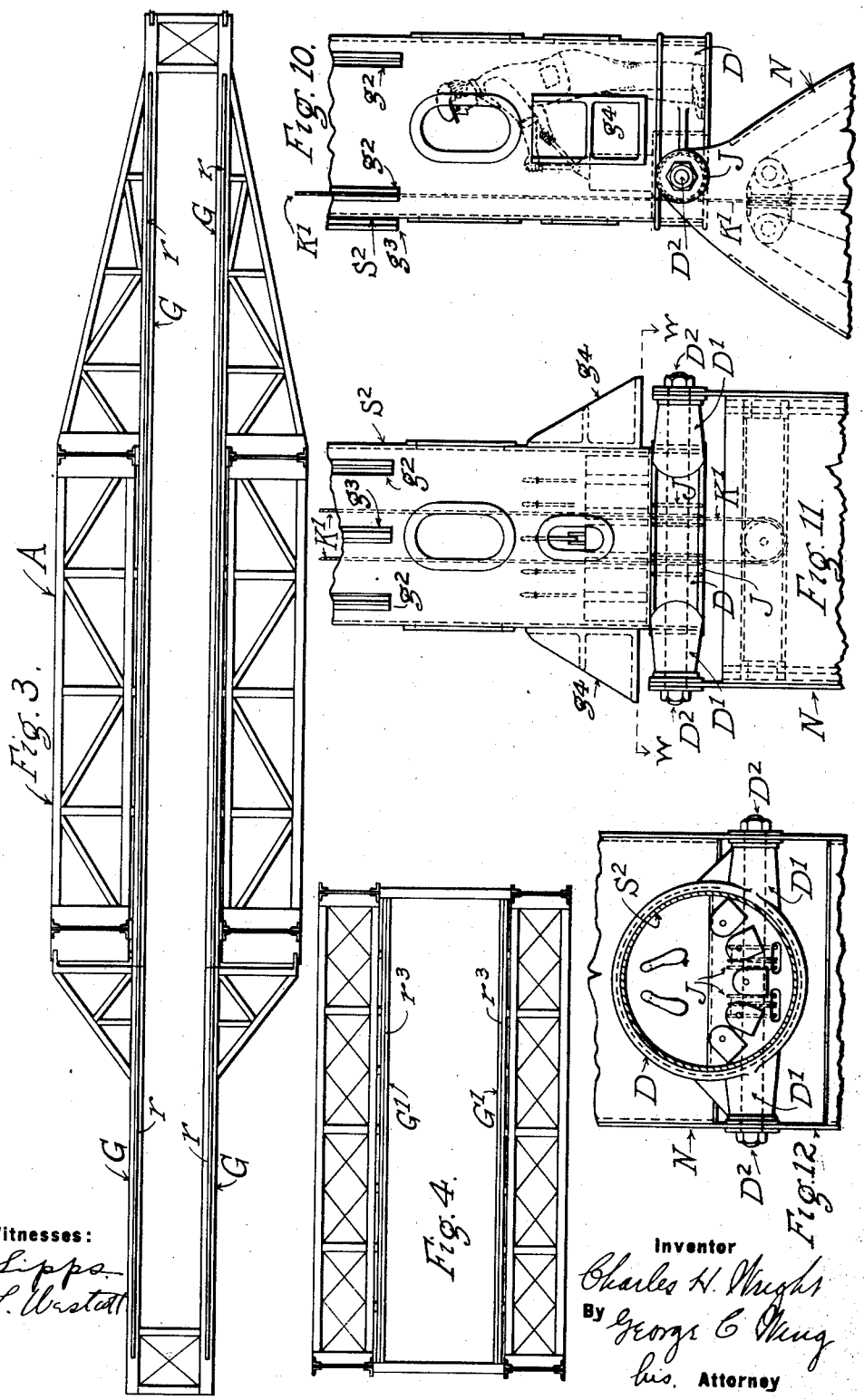

C. H. WRIGHT.
APPARATUS FOR HANDLING ORE.
APPLICATION FILED MAY 27, 1911.

1,007,762.

Patented Nov. 7, 1911.
8 SHEETS—SHEET 5.

Witnesses:

Inventor
Charles H. Wright
By George C. Wing
his Attorney

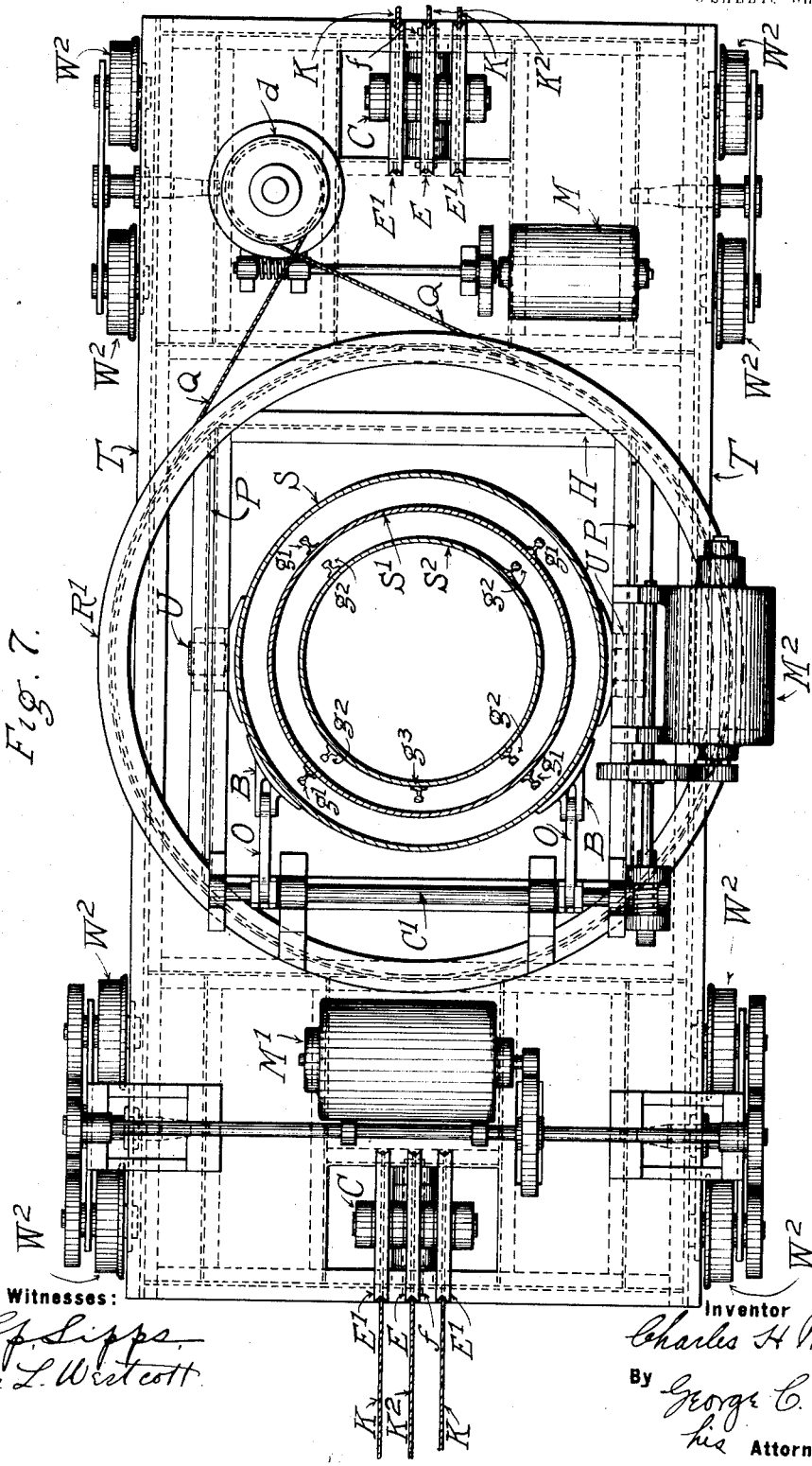

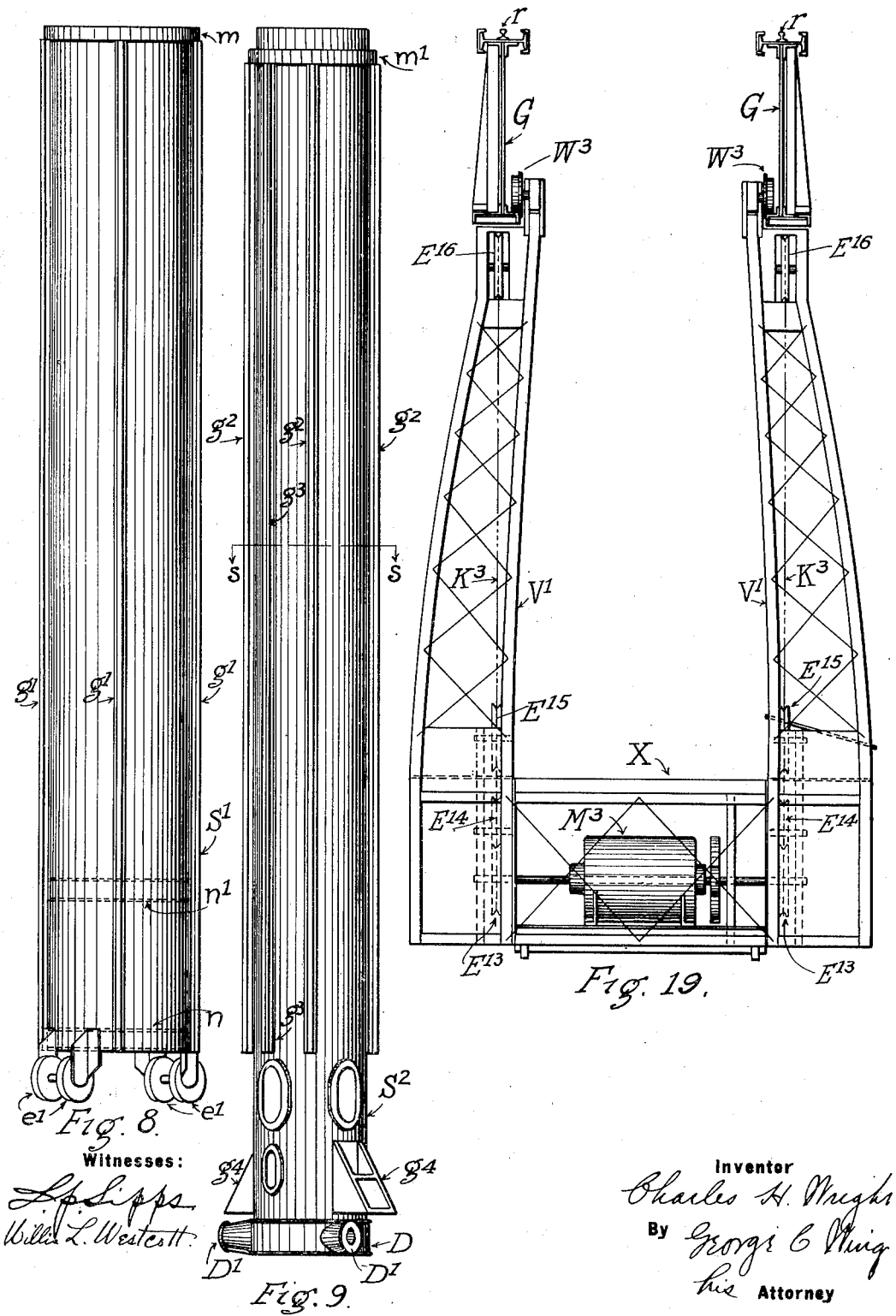

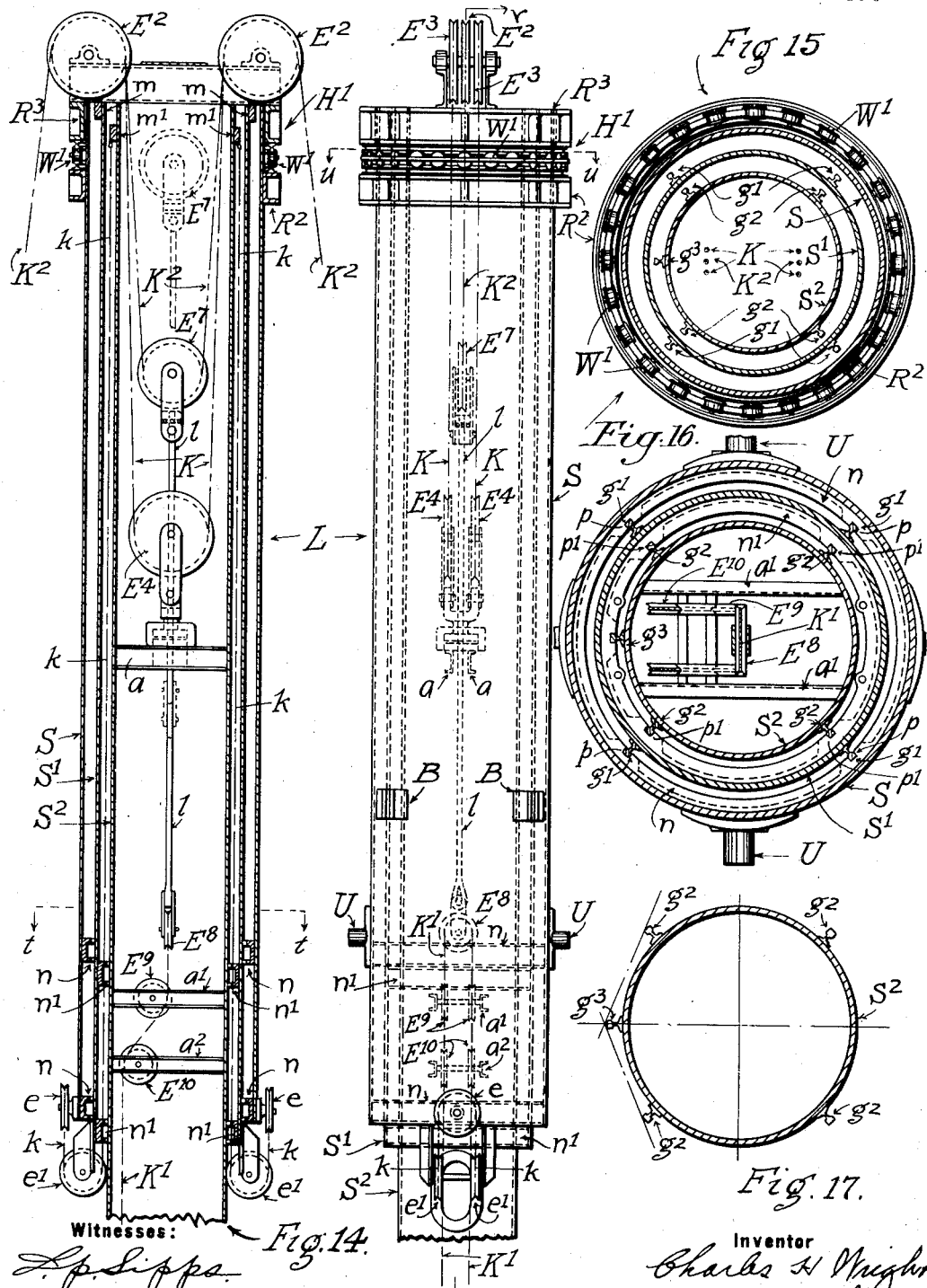

UNITED STATES PATENT OFFICE.

CHARLES H. WRIGHT, OF CLEVELAND, OHIO, ASSIGNOR TO THE BROWN HOISTING MACHINERY COMPANY, OF CLEVELAND, OHIO, INCORPORATED.

APPARATUS FOR HANDLING ORE.

1,007,762.  Specification of Letters Patent.  Patented Nov. 7, 1911.

Application filed May 27, 1911. Serial No. 629,957.

*To all whom it may concern:*

Be it known that I, CHARLES H. WRIGHT, a resident of Cleveland, in the county of Cuyahoga and State of Ohio, have invented certain new and useful Improvements in Apparatus for Handling Ore, of which the following is a full, clear, and exact description, reference being had to the accompanying drawings, that form a part of the specification, wherein similar parts are designated by the same letter in each case.

The improvement in question belongs more particularly to the special class of machinery for loading and unloading ore, coal and like gross material into or from vessels, cars, stockpiles, etc., wherein the bucket is hoisted, lowered and generally controlled in its filling movements by a stiff, depending-leg or member, in contradistinction to the flexible rope and sheave system of the earlier types, and the principal object and aim of the present invention is to provide an apparatus of the class referred to that, by reason of its peculiar design and principle of construction, shall afford a maximum of efficiency at a minimum of constructive and operative cost.

Figure 20:
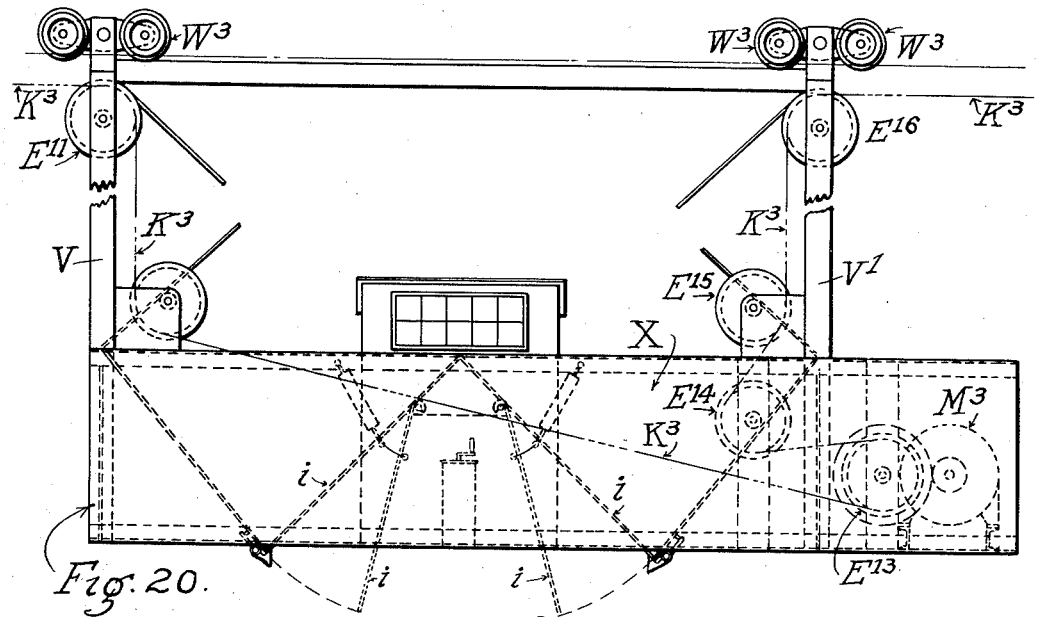
Figure 6:
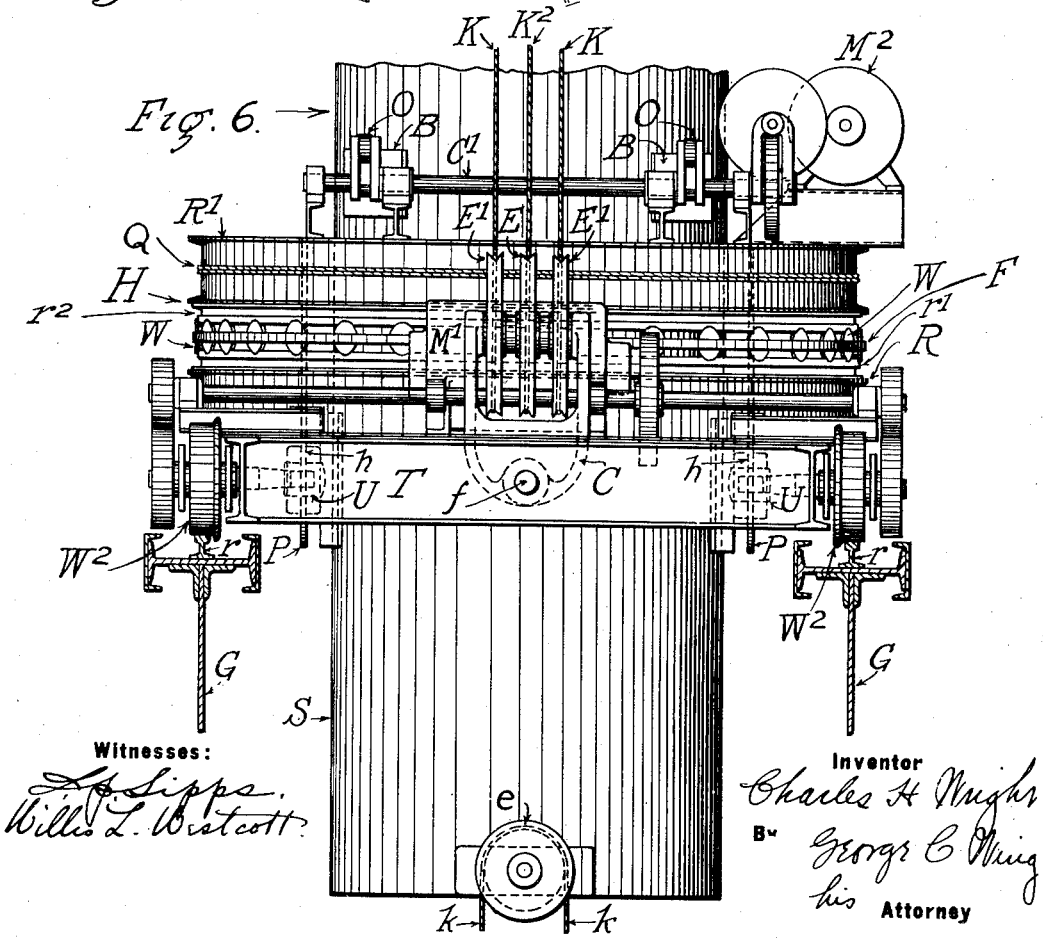

In the drawings Figure 1 is a side elevation of the apparatus as a whole. Fig. 2 is a front elevation of the same when the apron is removed and the bucket in its raised position. Fig. 3 is a horizontal section on the line $z$ $z$ of Fig. 1. Fig. 4 is a horizontal section on the line $y$ $y$ of Fig. 1. Fig. 5 is a side elevation of the trolley and a portion of the depending-leg or member carried thereby. Fig. 6 is an end view of the same. Fig. 7 is a horizontal section on the line $x$ $x$ of Fig. 2. Figs. 8 and 9 are perspective views, in the direction of the arrow in Fig. 15, of tubular sections that make up said member. Fig. 10 is a side view of the lower end of said member and of the upper portion of the attached bucket. Fig. 11 is an end view of the same. Fig. 12 is a horizontal section on the line $w$ $w$ in Fig. 11. Fig. 13 shows the leg in a retracted position with the lower portion of the inner tubular section removed. Fig. 14 is a vertical section of the same on the line $v$ $v$ of Fig. 13. Fig. 15 is a horizontal section on the lines $u$ $u$ of said last named figure. Fig. 16 is a horizontal section on the lines $t$ $t$ of Fig. 14. Fig. 17 is a horizontal section on the lines $s$ $s$ of Fig. 9. Fig. 18 is a side view of the leg when the bucket is in position for operation at one side of its horizontal line of travel. Fig. 19 is a rear end view of the transfer car arrangement shown in Fig. 1, and, Fig. 20 is a broken side view thereof through its vertical dimensions.

In the drawings A is a supporting framework, of any approved form of construction, on which the operative parts of the apparatus are duly located. It is here indicated as movably mounted on a track along the front of a dock and as arched above or straddling railroad tracks upon which cars may be brought up to receive their loads. Transversely through the framework and overhanging the same at each side, after the manner of the so-called "fast plants" employed in ore-handling operations, parallel horizontal girders G G extend with rails $r$ $r$ thereon through their entire length. The framework may itself be mounted upon rails so as to be movable from one working station to another, or, of course, may be definitely located at a fixed point. As indicated in Fig. 1, the forward portion of said girders is adapted to be retracted upwardly and withdrawn from its horizontal position when the apparatus is being moved to a new station or is to be idle.

Upon the girders G, and adapted to travel along the rails $r$, on the wheels $W^2$, I provide a rectangular frame-work wheel-truck or trolley T at the front and rear ends of which are located, in a casing C provided for the purpose, a set of three parallel sheaves, the middle sheave in each set being designated by E, and the outer sheaves by $E^1$. The castings in which these sets are mounted are pivoted to the trolley-frame by pins, as indicated at $f$. As the immediate supporting and actuating medium for the depending-leg in this case, a turntable H is provided centrally of the trolley. It is made up of a fixed ring-piece R that carries a continuous rail $r^1$ around its upper side on which a series of preferably flanged rollers W are designed to travel. These rollers are revolubly connected to a concentric band F radially to the ring-piece R. Resting on these rollers, along a continuous rail $r^2$ on the lower side of the same, is a second ring-piece $R^1$ corresponding in shape and construction with the ring-piece R, and within and secured to the ring-piece $R^1$ on opposite sides thereof, two parallel trunnion-plates P extend downwardly through the ring R. At the lower portion of said plates are holes $h$ to receive, at an operative fit, trunnions U on the opposite sides and near the lower end of a leg-sleeve S. The last named part is an extended tubular section that is held in suspension within the turntable H by the engagement of its trunnions with the trunnion-plates P just described. The turntable H is rotated by means of a rope Q that passes around the ring-piece $R^1$ and a drum $d$, on the trolley and in line with the same, which is actuated by a special motor M provided for the purpose. To effect a tilting of the sleeve S upon the trunnions U, and a consequent directing of the depending-leg, away from the vertical as the process of getting a load demands, I locate a crank-shaft $C^1$, in suitable bearings, above and on one side of the ring-piece $R^1$, and parallel with the axis of the trunnions U.

Connecting rods O extend from the shaft, at opposite sides of the leg-sleeve S, where they are pivotally fastened to said sleeve through the brackets B. As indicated in the drawings (Figs. 6 and 7) the shaft $C^1$ is actuated by a special motor $M^2$, on the trolley T, through a worm and gear mechanism provided for the purpose.

The depending-leg, above referred to, is herein designated, as a whole, by L. It includes the leg-sleeve S as a primary section of the same and subordinate tubular sections $S^1$ and $S^2$ which are of suitable dimensions with respect to each other and the primary section S, to permit said subordinate sections to be successively telescoped one within the other, as shown in Figs. 2, 13 and 14. As a desirable feature to insure a perfect alinement of said sections relatively to each other, a series of equi-distant longitudinal guide-rails $g^1$ and $g^2$ are located on the exterior surface of, respectively, the sections $S^1$ and $S^2$, and a pair of alinement-rings $n$ and $n^1$, are located within, respectively the sleeve S and the tubular section $S^1$ next in the series, with gaps or interruptions at $p$ and $p^1$ for the admission through and engagement therewith of said upright guide-rails $g^1$ and $g^2$.
An intermediate guard-rail $g^3$ is shown, up and down the lowermost of said sections, $S^2$, for the purpose of receiving the impact in the event of the leg encountering the sides of a hatch as it is raised with the load.
Exteriorly of the sections $S^1$ and $S^2$, at or near their upper ends, are annular stops or rims $m$ and $m^1$ to respectively bring up and bear against the uppermost alinement-rings $n$ and $n^1$ when said sections are in their extreme extended position relatively to each other.

Equalizing sheaves $e$ are diametrically arranged on the outside of the lower end of the leg-sleeve S, and, depending from the corresponding end of the tubular section $S^1$, are two opposing pairs of sheaves $e^1$ $e^1$. These sheaves serve or assist in sustaining the section $S^1$ within the section S under the condition of movement required, and this result is effected by anchoring ropes $k$ to the rim $m^1$ at, respectively, two diametrical points thereon, and carying the same downwardly and around one member respectively in the pairs of sheaves $e^1$, thence upwardly, in a loop, around the side-sheaves $e$ $e$ on the outside of the sleeve S, down and around the other member in each pair of sheaves $e^1$ and, upwardly again to the stop or rim $m^1$ and a fixed anchorage there. At and around the top of the leg-sleeve S, of the leg L, I provide a second turntable $H^1$, of a similar constructive design as the turntable H, its lower ring-section $R^2$, on which rollers $W^1$ are arranged to revolve, being fixed to S, and, the upper of said sections $R^3$ resting on the rollers, and serving as a base or support for two sets of three sheaves each, on opposite sides of the section, the middle sheave of each set being designated by $E^2$ and the outer sheaves by $E^3$.

At approximately the middle point within the leg-sleeve S, are a pair of parallel struts $a$, $a$, extending cross-wise of the same, to which is attached a pair of swiveled lifting sheaves $E^4$ $E^4$ around which are severally reaved ropes K that pass, on one side of their sheaves, upwardly around sheaves $E^3$ $E^3$, on the turntable $H^1$, down around the sheaves $E^1$ $E^1$, on the trolley T, to an anchorage at the outer end of the girders G, and, on the other side of said sheaves, upwardly around the unoccupied sheaves $E^3$ $E^3$, down around sheaves $E^1$ $E^1$, to sheaves $E^5$ $E^5$ on the farther or inner end of the girders G, and, thence, back over deflecting sheaves $E^6$ $E^6$ on the framework A, to a source of power at I. In this manner, as will be apparent, when the leg L is rotated within the trolley T, a fixed relation of the sheaves $E^3$ and $E^1$, and the ropes K interreaved between the same, is insured.

To provide for the closing-rope of the bucket that is to be connected with the apparatus, I locate within the fixed sleeve or section S, above and intermediately of the pair of sheaves $E^4$, a lifting-sheave $E^7$ that is swiveled to a rod $l$ that extends downwardly therefrom between the pair of sheaves $E^4$, and through their swivel below. To the lower end of this rod, a sheave $E^8$ is attached and below the latter, upon transverse frameworks $a^1$ and $a^2$ provided for the purpose, are duly mounted an upper and lower pair of deflecting sheaves $E^9$, $E^9$ and $E^{10}$, $E^{10}$. To provide for the due connection of the bucket itself to said leg, I affix a cylindrical casting D to and around the extreme lower end of the tubular section $S^2$, the said casting having hub-like projections

$D^1$, $D^1$ on each side of the same in line with a chord of the casting, and a continuous hole or holes in alinement with each other through said projections across the casting itself. In the illustrations the bucket N is of the grab-bucket type wherein the opposing blades open by gravity but are invariably closed by chains or ropes that engage and raise a cross-head within the same. For the efficient operation of this kind of bucket, and to obtain a maximum load in each case, it is important that, when the bucket is landed on the source of supply, it shall be entirely free to adapt itself to the contour of the material from which the grab is to be made. This is always the condition of its operation when used in connection with the flexible hoisting and closing methods of the rope-and-sheave system for which it was originally designed, and it is equally desirable, that any combination of this type of bucket with the stiff-leg system of hoist, shall fully take into account and provide for this operative feature. The apparatus and invention in question, accordingly involves the attachment of the grab-bucket N to the hoisting-leg L in a manner that allows a free movement of the bucket in a direction parallel to its sides, but that holds it rigidly in a direction at right angles thereto. In consequence the bucket may be landed in a normal working position against the sloping face of a stockpile, for instance, with both blades in firm contact therewith, and without undue strain on either the depending-leg or the bucket itself. Said attachment, in the specific instances shown, is effected by loosely hanging the grab-bucket N through holes in the top of its sides to the projecting ends of a pin $D^2$ that is passed in through the hole referred to in the casting D, and extends or overhangs outwardly thereof, at either side, for the purpose. In this manner the bucket is hinged or flexibly connected to the leg L at one side thereof, and under conditions that insure the most effective working of the same.

A bucket-closing rope $K^1$ is shown as passing around a sheave in the cross-head in the bucket upwardly and around an intermedial drum J, thence upwardly between the deflecting sheaves $E^{10}$ and $E^9$ to and around the sheave $E^8$, on the rod $l$, downwardly, in a reverse course, to and around a second and similar drum J, to a junction with its other end at the place of starting. Although I show a double system of closing ropes in the drawings it is manifest that a single rope system, with anchorage at the upper and lower terminal points can be employed instead.

The system just followed out through the drawings is further extended by the rope $K^2$ that passes around the sheave $E^7$, already described, on one side thereof, upwardly and around the central member $E^2$ of one set of the sheaves that are mounted on the turntable $H^1$, and down and around the sheave E, on the front of the trolley T, to an anchorage at the outer end of the girders G, and, on the other side, upwardly and around the companion sheave $E^2$ on said turntable, thence downwardly, around the sheave E on the rear of the trolley, to and around a sheave $E^5$ at the inner end of said girders, and from there backwardly, over a deflecting sheave $E^6$ on the framework A, to the source of power at I.

Downwardly sloping projections $g^4$ are shown at the lower end of the leg L to shield the bucket and its connections from contact with hatches as they are raised through the same: Also, the requisite port-holes for the convenience of the operator who will be stationed immediately within the section $S^2$ at that portion of said leg, with controllers for the various motors within convenient reach (Figs. 10 and 12).

As an auxiliary feature of the apparatus a transfer-hopper X is arranged to travel beneath the girders G and the upper range of movement of the leg L and bucket N. This is effected, in the particular manner chosen to illustrate the idea herein, by suspending the rectangular hopper-body X, by hanger-like members V and $V^1$, that take hold of the hopper at or near the several corners, from wheels $W^3$ mounted on the lower inside flanges of said girders. These members should be wide enough apart to permit the passage of the leg and bucket therethrough as they are carried along by the overhead trolley T.

A motor $M^3$ is shown within the hopper-frame for traversing the same which movement is brought about by a rope system wherein ropes $K^3$ $K^3$, anchored at the forward end of the girders G, are led to and around sheaves $E^{11}$ at the upper part of V, (Fig. 20) thence downwardly to and around sheaves $E^{12}$, on the same members, backwardly to grip-sheaves $E^{13}$, mounted at the rear end of the hopper, thence forwardly to and around sheaves $E^{14}$, carried by a projecting framework on the same, upwardly behind deflecting sheaves $E^{15}$ to and around sheaves $E^{16}$ on the upper part of the hangers $V^1$, thence to and around sheaves $E^{17}$ and $E^{18}$ at the rear end of the girders G, from whence said ropes are carried back over sheaves $E^{19}$ to take-up drums $J^1$ on the top of the framework A and fastened.

The hopper is duly equipped with discharge gates which are indicated by the dotted lines $i$, $i$ in Fig. 20, and, a weighing machine Y, for determining the amount of the discharges therethrough from time to time, may be located below said hopper, as shown in the full lines in Figs. 1 and 2, to travel, on special rails $r^3$ and a supporting framework G¹ therefor. An operator's station may conveniently be located upon the hopper from which its movements and those of the weighing machine may be directed.

To assist the hoisting and telescopic movements of the leg-parts S¹ and S², counterweights Z are introduced. These are carried by ropes K⁴ with one end of the same anchored to the girders G, behind the framework A, which pass beneath the counterweight-sheaves upwardly, over sheaves E²⁰ on said framework, to the source of power I, where they are reversely wound on the drum that actuates the ropes K.

Assuming the apparatus is to be applied under the conditions and in the situation of material disclosed by the drawings, the trolley T is run out along its track by its own motor M¹ until it is above a given hatch, with the sections S¹ and S² telescoped relatively to the leg-sleeve S and to each other and the bucket N swinging therefrom around the pin D². Thereupon, the rope K is paid out from the source of power, over its various sheaves with the result that E⁴, sustained by said rope, and the tubular section S² depending from said sheave, will both descend. This movement will necessarily lower the supporting-sheaves $e^1$, upon the section S¹, and permit the latter part to itself descend through the leg-sleeve S, simultaneously with the section S², but to only one-half the distance, and the leg L, as a whole, to extend to the full limit of its vertical travel or movement. Meanwhile the operator is also paying out the ropes K², controlling the closing of the bucket, with the same speed as the rope K, and the bucket with extended jaws will approach the material to be grabbed and may be operatively rested thereon without undue strain on either bucket, leg or the inner bottom of the vessel's hold. The bucket may now be immediately closed around its load, and raised, by first taking in on the ropes K² until the bucket is closed and, then, at the same pace on the rope K, whereupon the telescoping of the parts S² and S¹, and the consequent elevating of the bucket and load must follow as a reverse operation to that above described for lowering the bucket. When the leg is in this manner withdrawn upon itself, within the sleeve-part S, it will, of course, be poised upon its trunnions on and through the trolley T, and in position to be carried by the latter backwardly along the girders G to any point for unloading beneath their span. This last operation is effected, of course, by paying out the closing-ropes K², and the discharge itself may be made either directly into cars or stock-pile, or, in the first instance, into the transfer-car or hopper X. In the latter case, obviously the more economical practice will be to run the hopper out and receive the load of the bucket therein when the latter has been raised by the leg L to its highest position, whereby the necessity of any horizontal movement of the leg and load will be avoided. The hopper may then be traversed backwardly, and its contents discharged into the weighing machine, cars or stockpile while the bucket is being again lowered and a new load brought up. Of course, loading from stockpile to cars or vessel is substantially a reverse operation to that above described, and, manifestly by reason of the two-way movement upon the turntable H and its trunnions U, of which the leg L is capable—the leg, as desired, may be so rotated and tilted as to be directed toward, and the bucket placed upon material at any point off the vertical that is within the predetermined limit of the leg's said inclination or tilting movement. (See Fig. 18, and the dotted lines at the rear end of G, Fig. 1.) Further, the employment of intermedial drums J, at the pivotal or hinged connection of the grab-bucket to the leg, around or between and against which the closing-ropes may be wound or bear, is regarded as an important special feature in an apparatus of the general type involved, inasmuch as, by such arrangement, said ropes will have a common point of radiation or revolution with the bucket itself and, consequently, will not be brought up against the edge of the leg no matter what angle with respect to the latter the bucket assumes.

Although, in the embodiment of my invention described, I show a telescopic depending-leg and one that is made up of tubular sections, I do not wish to thereby limit the same, when broadly considered, to such special forms of construction, nor, in this sense, are the particular forms of reaving, the number and location of sheaves, the particular method and manner of supporting, rotating and tilting the leg, and other details shown, to be treated as essential specifications and restrictions in the premises. The several sections of the leg, for instance, may be made up of frame-work instead of integral material, and the vertically moving portion of said leg, instead of being in distinct parts or sections, may be in a single piece, without, in either case, departing from the invention as broadly claimed.

Having thus described my said invention as the same is represented in a concrete working-structure, what I claim and desire to secure by Letters-Patent, is:—

1. In an apparatus for handling ore, the combination of a framework, a trackway supported by and overhanging the same, a trolley having a rotatable turntable on said trackway, a vertically-adjustable leg pivotally suspended from and through said turntable, and a grab-bucket pivotally connected to said leg, together with suitable means for severally traversing said trolley along said trackway, rotating said turntable on said trolley, actuating said leg about its pivotal suspension thereon and vertically within said turntable, and, for opening and closing said bucket, all substantially as shown and described.

2. In an apparatus for handling ore, the combination of a framework, a trackway supported by and overhanging the same, a trolley on said trackway, a vertically-adjustable hollow leg rotatably and pivotally suspended from and through said trolley, a bucket connected to said leg, and means for, severally, moving said leg rotatively, pivotally and vertically on and in respect to said trolley, traversing the trolley along its trackway, and for opening and closing the bucket about its load, substantially as shown and described.

3. In an unloading apparatus a horizontal trackway, a trolley mounted thereon, a turntable on the trolley, a vertically-adjustable leg pivotally supported on the turntable, a bucket pivotally connected to the leg, and mechanism for severally rotating the turntable on the trolley, moving the leg about its pivotal support thereon, adjusting the leg vertically, traversing the trolley along the trackway, and opening and closing the bucket about a load, substantially as shown and described.

4. In an unloading apparatus, the combination of a trackway having a clear space centrally therethrough, a trolley mounted thereon across said space, a depending-leg rotatably mounted on said trolley and made up of a series of tubular sections suitably related to be moved telescopically with respect to each other when force is applied for the purpose, a bucket hinged to the inner member of said series, and suitable means for, severally, applying the force necessary to move said sections telescopically with respect to each other as stated, rotate said leg on the trolley, traverse the trolley along said trackway and open and close the bucket, substantially as shown and described.

5. In an unloading apparatus, the combination of a trackway having a clear space centrally thereof, a trolley mounted on said trackway across said space, a depending-leg mounted on said trolley rotatively with respect to both its longitudinal and its transverse axis, and made up of a series of tubular sections suitably related, to be moved telescopically with respect to each other when force is applied for the purpose, a bucket hinged cross-wise of the same to the inner member of said series, and suitable means for, severally, applying the force necessary to move said sections telescopically with respect to each other as stated, rotate said leg on said trolley on either or both of its said axes, traverse said trolley along said trackway, and open and close said bucket, all substantially as shown and described.

6. In an unloading apparatus, the combination of a trackway having a clear space centrally therethrough, a trolley mounted thereon across said space, a leg-sleeve mounted on said trolley rotatively with respect to both its longitudinal and its transverse axis, a hollow leg suitably connected to said leg-sleeve to rotate therewith when said sleeve is rotated upon said trolley, and to be moved up and down within the same when force is applied for the purpose, a bucket hinged cross-wise of the same to the lower end of said leg, and suitable means for, severally, applying said up and down moving force, rotating said sleeve on either or both of said axes, traversing said trolley along said trackway, and opening and closing said bucket, substantially as shown and described.

7. In an unloading apparatus, the combination with a supporting frame having a laterally extensible trackway with a clear space centrally of the same, of a trolley mounted thereon across said space, a leg-sleeve mounted on said trolley rotatively with respect to both its longitudinal and its transverse axis, a hollow leg suitably connected to said leg-sleeve to rotate therewith when said sleeve is rotated upon said trolley, and to be moved up and down within the same when force is applied for the purpose, a bucket connected to the lower end of said leg, and suitable means for, severally, applying said up and down moving force, rotating said sleeve on either or both of said axes, traversing said trolley along said trackway and opening and closing said bucket, substantially as shown and described.

8. In an unloading apparatus, the combination, with a supporting frame, of a beam-structure therethrough that is extensible laterally therefrom and has a clear space centrally of the same, a trackway on said beam-structure, a trolley traversibly mounted thereon across said space, a hollow leg depending from and through said trolley having a grab-bucket hinged cross-wise to its lower end, and an intermedial drum, for the closing-ropes, revolubly connected to said end along the line of the bucket's hinged connection thereto, substantially as shown and described.

9. In an unloading apparatus, the combination, with a supporting frame having a laterally extensible trackway thereon with a clear space centrally of the same, of a trolley traversibly mounted on the upper side of said trackway across said clear space, a vertically-movable-leg rotatively mounted on said trolley with a grab-bucket hinged to the lower end of the same, a transfer-car suspended beneath said clear-space from wheels suitably mounted on tracks therefor respectively located on said trackway at opposite sides of said space, together with suitable means for, severally, rotating said leg with relation to the trolley, raising and lowering the same with the connected bucket vertically, traversing said trolley and leg upon said trackway, and said transfer-car along its tracks, and for opening and closing said bucket, all substantially as shown and described.

10. In an unloading apparatus comprising a supporting frame with a laterally extensible beam-structure therethrough having a clear space centrally of the same, and, a trolley traversibly mounted thereon across said space, the combination of a depending-leg, rotatively mounted on said trolley, made up of a series of tubular sections suitably related to be moved telescopically with respect to each other, a grab-bucket hinged cross-wise of itself at the lower end thereof, and the severally described rope-and-sheave systems for sustaining, and coöperatively actuating said leg, bucket and trolley in their various designed movements, substantially as shown and described.

CHARLES H. WRIGHT.

In presence of—
 WILLIS L. WESTCOTT,
 L. P. SIPPS.

Copies of this patent may be obtained for five cents each, by addressing the "Commissioner of Patents. Washington, D. C."